Figure 1:
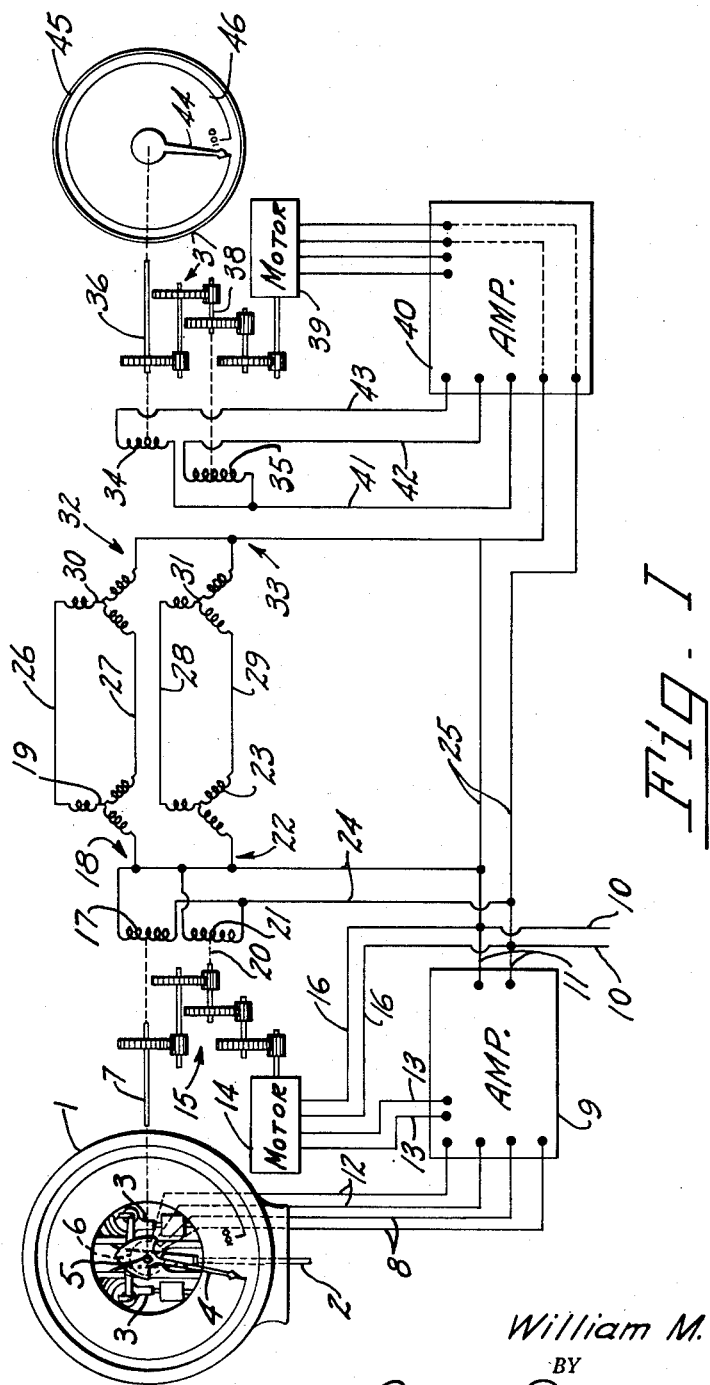

Dec. 28, 1954

W. M. PEASE 2,698,407

DUAL CHANNEL REMOTE INDICATING
SYSTEM FOR WEIGHING SCALES

Filed Nov. 30, 1949

3 Sheets-Sheet 1

INVENTOR.
William M. Pease

BY

Marshall, Marshall & Leonard
ATTORNEYS

Dec. 28, 1954   W. M. PEASE   2,698,407
DUAL CHANNEL REMOTE INDICATING
SYSTEM FOR WEIGHING SCALES
Filed Nov. 30, 1949   3 Sheets-Sheet 2
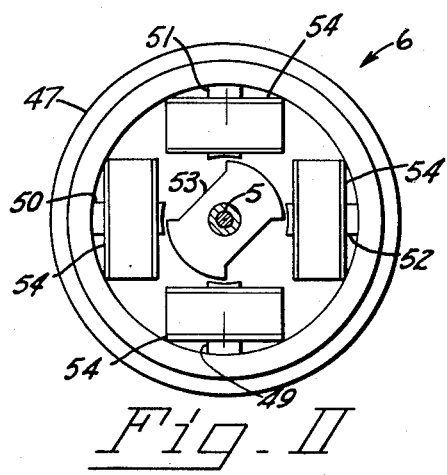
Fig. II
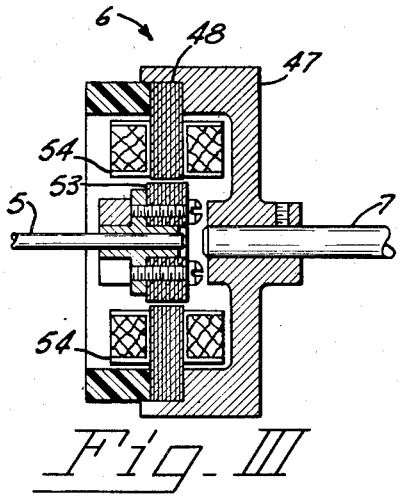
Fig. III
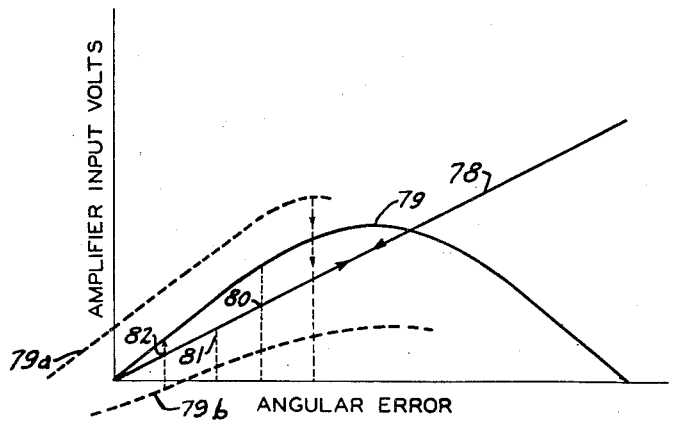
Fig. V
INVENTOR.
William M. Pease
BY
Marshall, Marshall & Leonard
ATTORNEYS Dec. 28, 1954
W. M. PEASE
2,698,407
DUAL CHANNEL REMOTE INDICATING SYSTEM FOR WEIGHING SCALES
Filed Nov. 30, 1949
3 Sheets-Sheet 3
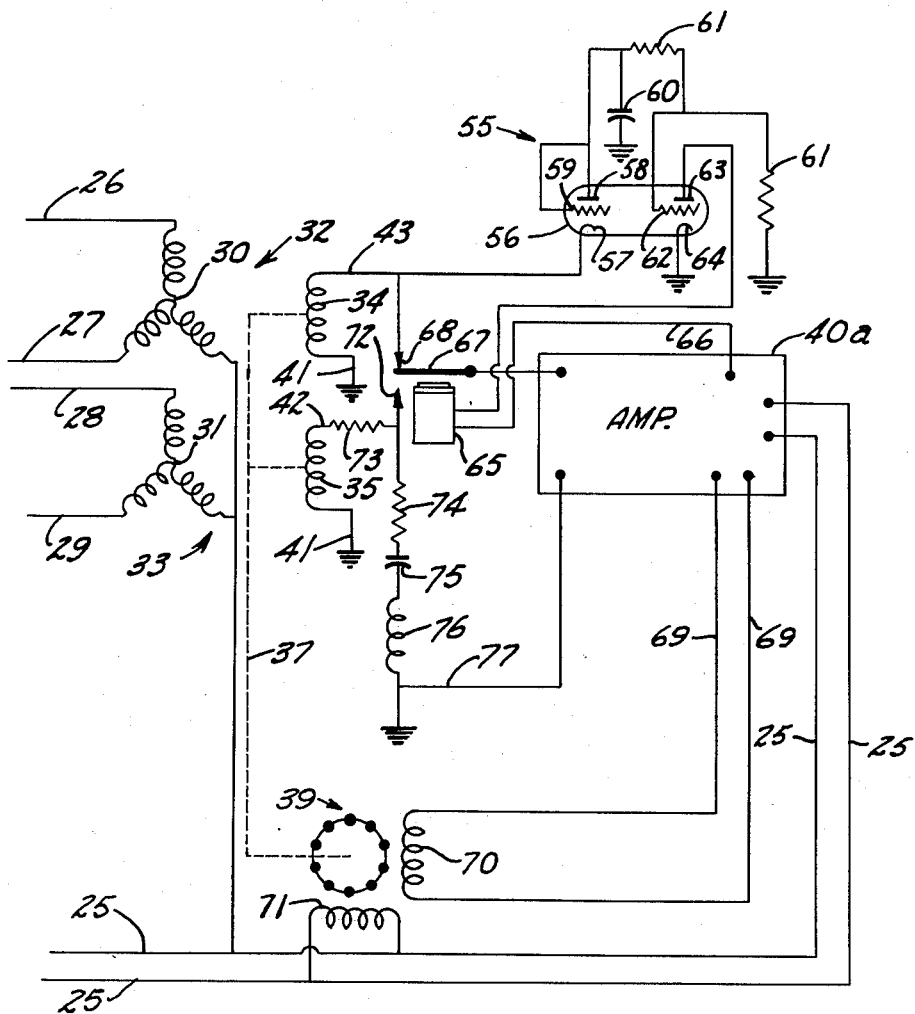
Fig. IV
INVENTOR.
William M. Pease
BY
Marshall, Marshall & Leonard
ATTORNEYS

United States Patent Office 2,698,407
Patented Dec. 28, 1954

2,698,407

DUAL CHANNEL REMOTE INDICATING SYSTEM FOR WEIGHING SCALES

William M. Pease, Woburn, Mass., assignor to Toledo Scale Company, Toledo, Ohio, a corporation of New Jersey Application November 30, 1949, Serial No. 130,269

3 Claims. (Cl. 318—30)

This invention relates to mechanism for repeating at a remote location the indication of a weighing scale, and more particularly to a particular combination of elements that yields high accuracy and quick response in the remote indication.

Automatic weighing scales have been constructed to give highly accurate indications of load. One of the greatest problems to be overcome in constructing a highly accurate scale is to eliminate or reduce the friction in the mechanism, including the indicating mechanism, so that the residual frictional forces are negligible in comparison with the forces exerted by the load and the counterbalancing mechanism. Since the only force available to drive the indicating mechanism of an automatic weighing scale is the unbalance between the load forces applied to the weighing scale and the counterbalancing force of the pendulums or springs it follows that any friction in the indicating mechanism appears as a counterbalancing force thereby causing a corresponding error in indication. This susceptibility of the indicating mechanism to friction or externally applied forces makes it impossible to directly connect remote indicating devices to the weighing scale and still secure accurate indication.

Another difficulty encountered when attempting to supply remote indication for a weighing scale is the slow speed of response, and instability as well as low positional accuracy of known remote indicating devices.

The principal object of this invention is to provide a composite remote indicating system that has a response time short in comparison with the time required for the counterbalancing mechanism to come to rest after a change in load and that repeats the weighing scale indication with a repeating error not greater than the probable error of the weighing scale either with or without the addition of the remote indicating system.

Another object of this invention is to provide a remote indicating system in which electrical signals indicative of coarse and fine error in remote indication are derived from slow and high speed control generators and the signals are matched in amplitude as well as in phase when the control is transferred from one of the generators to the other.

Another object of the invention is to provide a remote indicating system in which a torque amplifier or servo mechanism is inserted between the remote indicating system transmitter and the indicating mechanism of a weighing scale so as to relieve the weighing scale indicating mechanism of all frictional or drying forces introduced by the transmitter of the remote indicating system.

More specific objects and advantages are apparent from the following description of a preferred embodiment of the invention.

According to the invention a weighing scale is provided with remote indication by connecting an electrically actuated servo mechanism to its load counterbalancing mechanism, preferably to the indicating mechanism, with the servo mechanism in turn arranged to drive the transmitting generators of a remote electrically actuated servo mechanism of the remote indicator. As an ancillary feature circuits are included in the remote servo mechanism so that the signals from the low speed and high speed (coarse and fine indication) transmitters are substantially equal in amplitude and in phase at such times as the control is shifted from the low speed to the high speed transmitter signals during an approach of the remote indicator to its correct synchronized position. This latter feature is of considerable importance in assuring high response speed as well as freedom from undesirable transient effects in the remote servo indicating mechanism when the control transfers from one control generator to the other.

The improved remote indicating mechanism for a weighing scale is illustrated in the accompanying drawings.

In the drawings:

Figure I is a schematic diagram showing the general organization of the system and the major components employed in transmitting an indication from a weighing scale to a remote indicator.

Figure II is an enlarged front elevation of a variable reluctance generator employed to generate an electrical signal in accordance with the lack of synchronism between the scale indicator shaft and an output shaft of the torque amplifier or first servo mechanism.

Figure III is a vertical section taken through the reluctance generator to show the details of construction.

Figure IV is a schematic wiring diagram of the remote servo mechanism to show the electrical circuits for generally equalizing the amplitude of the control signals from the low and high speed transmitters during such time as the control shifts from one to the other of said generators.

Figure V is a diagram in the nature of a graph to illustrate the equalization of voltages and operation of the switching circuit that transfers the control from the fast to the slow speed transmitter or back again depending upon the departure of the remote indicator from its position of synchronism with the scale indicator.

These specific figures and the accompanying description are intended merely to illustrate the invention but not to limit its scope.

A complete system for remotely indicating the magnitude of a load placed on the load receiver of a weighing scale includes a conventional weighing scale load counterbalancing mechanism enclosed within a dial housing 1. The force from a load being weighed is transmitted through a steelyard rod 2 and counterbalanced by a pair of load counterbalancing pendulums 3 that are operatively connected to rotate an indicator 4 carried on an indicator shaft 5. The indicator 4 cooperates with a series of indicia on a stationary chart to indicate at the scale the magnitude of the load. If no indication of load at the weighing scale itself is required the indicator 4 and the chart may be omitted.

An induction generator 6 (see also Figures II and III) is ararnged to generate an electrical signal corresponding to the lack of synchronism between the indicator shaft 5 and a torque amplifier output shaft 7.

The induction generator 6 is energized with low voltage alternating current through a pair of leads 8 connected to an amplifier 9. The amplifier 9 receives its power through power leads 10 and branch circuit leads 11.

Output voltage from the induction generator 6, proportional to the lack of synchronism between the indicator shaft 5 and the servo output shaft 7, is transmitted through signal leads 12 to the input of the amplifier 9. The output of the amplifier 9, the amplified signal received from the induction generator 6 plus a derivative signal proportional to the rate of change of amplitude of the generator signal, is transmitted through output leads 13 to one winding of a two phase induction motor 14 the armature shaft of which drives a gear train 15 including the output shaft 7. The other phase winding of the two phase motor 14 is connected through leads 16 to the power leads 10.

The induction generator 6, the amplifier 9, and the motor 14 with its gear train 15 constitute a torque amplifier or servo mechanism for driving the output shaft 7 and maintaining that shaft, by follow-up action, in synchronism with the indicator shaft 5 of the weighing scale.

The output shaft 7, the low speed shaft of the gear train 15 is mechanically connected to drive an armature carrying a winding 17 of a control generator or transmitter 18, the armature winding 17 cooperating with a three-section stator winding 19 of the low speed control transmitter 18. Likewise a higher speed shaft of the gear train 14, in this case an intermediate shaft 20, is arranged to drive an armature carrying an armature winding 21 of a high speed control transmitter 22. The control transmitter 22 has a three section distributed stator winding 23. The armature windings 17 and 21 are connected through leads 24 and 25 to the power supply leads 10. The control transmitters 18 and 22 generate voltages in the three section stator windings 19 and 23 that are indicative of the angular positions of the armature windings 17 and 21 with respect to the stator windings. The stator windings 19 and 23 are connected through leads 26, 27, 28 and 29 to three section stator windings 30 and 31 of a pair of control transformers 32 and 33. One of the leads 25 constitutes the third lead for each set in interconnecting the sets of stator windings 19, 30 and 23, 31. The control transformers 32 and 33 have armature windings 34 and 35 carried on armatures that are in turn mechanically driven by an output shaft 36 of a remote gear train 37 and a higher speed shaft 38 of the gear train. The remote gear train 37 is driven by a remote servo motor 39 which in turn is controlled by an amplifier 40.

The armature windings 34 and 35 are connected through leads 41, 42 and 43 to the input of the amplifier 40, switching arrangements being included within the amplifier 40 for selecting the signal generated by the armature 34 whenever a large departure from synchronism exists between the position of the armature 34 and the position of the transmitting armature 17. When the departure from synchronism is small the switching mechanism within the amplifier 40 selects the signal from the armature 35 driven by the higher speed shaft 38 of the gear train. The amplifier 40 is arranged to drive the motor 39 in a direction to reduce the signal voltages and thus bring the system into synchronism. A remote indicator 44 rotatably mounted within a remote dial housing 45 is driven by the output shaft 36 of the remote gear train 37 and cooperates with a chart 46 to provide indications of the magnitude of the load on the load receiver of the weighing scale.

In the operation of this type of equipment the armature windings 17 or 21 of the control generators generate voltages in the stator windings according to the relative position of the windings. These generated voltages produce currents in the interconnected stator windings 19, 30 and 23, 31 that induce magnetic fields in the control transformers 32 and 33 which fields occupy the same relative position in the control transformers that the armature windings 17 and 21 occupy in the generators. These magnetic fields in the control transformer generate signal voltages in the armature windings 34 and 35 which vary in amplitude according to the angular error and in phase according to the direction of the error in position of the transformer armatures with respect to the generator armatures.

The gear trains 15 and 37 are also arranged so that the high speed generator and transformer rotate at an exact odd multiple of the slow speed generator and transformer. The odd multiple relationship is employed to insure a single synchronizing point. Otherwise it would be possible for the system to synchronize 180° out of true synchronism at which point the voltage output of the slow speed control transformer is zero and the high speed transformer is in step with its generator. The odd multiple relationship ensures sufficient voltage output from the slow speed control transformer 32 under this condition to prevent false synchronization.

Thus the improved remote indicating system for a weighing scale includes a conventional system of fast and slow speed gear connected control transmitters (the transmitters 18 and 22) and a pair of control transformers (the transformers 32 and 33) arranged with the control transmitters driven by a servo mechanism which follows the scale indicator shaft without imposing any load thereon and with the control transformers driven by a remote motor to keep the remote indicator driven by the remote motor in positional synchronism with the scale indicator. This system has the advantage that no load is applied to the weighing scale indicating mechanism and the inertia of the remote mechanism does not constitute any part of the load on the torque amplifier motor 14.

Referring now to Figures II and III the induction generator 6 is shown in considerable detail. As shown therein the generator comprises an outer non-magnetic housing 47 carried on the output shaft 7 of the gear train 15, and a four-pole annular laminated field frame or stator member 48 carried in the non-magnetic member 47. The four-pole field frame 48 has its poles 49, 50, 51 and 52 inwardly directed to cooperate with an armature 53 carried on the scale indicator shaft 5. The armature 53 is shaped to provide two diametrically opposite, quarter circumference segments arranged to cooperate with the poles 49—52. The poles 49—52 are each provided with two coils wound on a bobbin 54. The coils are connected as two windings, each winding including one of the coils on each bobbin. One of the windings, energized through the leads 8, serves to establish an alternating magnetic field while the other winding, connected to the signal lead 12, has generated within it a voltage dependent upon the position of the armature 53 with respect to the pole pieces of the field frame. The energizing winding induces a magnetic field that divides and follows two paths, a first of which may be traced through the pole 49, across the gap into the armature 53, through the armature 53 and across the gap into the pole 51, and thence into the annular portion of the field frame 48 where it splits half going one way and half going the other around the periphery of the field frame 48 to the base of the pole 49 where it recombines to complete the first magnetic path. The second magnetic field path may be traced through the pole 50, across the air gap into the armature 53, and then across the next air gap into the pole 52 after which it splits part going one way and part the other around the periphery of the field frame to meet at the base of the pole 50 thus completing the second magnetic field path. The intensity of the magnetic flux threading each of these paths depends directly upon the reluctance of the air gaps included in the paths since the ampere turns of the energizing winding are equally divided among the poles. If the armature 53 turns from the position shown it increases the reluctance in one of the magnetic paths and decreases the reluctance in the other path.

The second or signal winding, also including one coil on each pole, is connected so that the voltage generated by the flux following one of the magnetic paths is in opposition to the voltage generated by the flux following the other magnetic path. Therefore when the armature 53 is in the position shown and the flux is equal in the two paths there is no output voltage from the signal winding. However, any movement of the armature relative to the field disturbs the equality of flux between the paths and a corresponding voltage appears on the signal leads 12. This particular construction avoids any mechanical connection whatsoever between the armature 53 and the stator or field frame 48 and, over a substantial angular movement, is nearly free from magnetic forces since the principal forces are acting radially and because the pull of one pole is balanced by a corresponding pull of another pole.

The electrical circuits included at the remote station and serving to control the motor 39 that drives the remote indicator 44 are illustrated in greater detail in Figure IV. For the purpose of securing high accuracy in the remote indication it is necessary to use both fast and slow speed control generators and transformers, the slow speed control serving as the signal source for the amplifier whenever the error in position is so large that the high speed transformer is more than one-half of one revolution away from its synchronized position. Since the high speed control transformer and generator execute a number of revolutions and since the transformer can only distinguish or indicate by itself parts of complete revolutions it is necessary to transfer the control to the slow speed generator and transformer whenever the error approaches on one-half revolution of the high speed generator and transformer. To prevent any possible false operation of the remote indicator it is preferable to transfer the control from the high speed transformer to the slow speed transformer whenever the error approximates an eighth of a revolution of the high speed transformer.

The switching between the leads 42 and 43 is controlled by an amplifier and rectifier circuit 55 included in the amplifier 40. This circuit employs a twin triode amplifier tube 56 having a cathode 57 connected to the armature lead 43 of the slow speed control transformer 32. A grid 58 and plate 59 cooperating with the cathode 57 are tied together and connected through a condenser 60 to a grounded return. In this arrangement the first triode section including the cathode 57 acts as a half-wave rectifier to negatively charge the condenser 60 to a voltage approximately equal to the peak voltage developed in the armature winding 34. The negative terminal of the condenser 60 is grounded through a pair of series connected resistors 61 with the junction of the resistors connected to a grid 62 of the second half of the twin triode 56 so that the resistors 61 serve as a discharge circuit for the condenser 60. The negative voltage applied to the grid 62 limits current flow between a plate 63 and cathode 64 of the triode. This triode section controls the current flow through a relay coil 65, the current being supplied through a lead 66 from the amplifier 40a. (The amplifier 40a includes all of the amplifier 40 except the relay control circuit 55 and a stabilizing circuit not yet described.) Whenever an appreciable voltage appears on the lead 43 as a result of lack of synchronism in the position of the armatures 17 and 34 the condenser 60 is charged negatively so that current flow through the second triode section and relay coil 65 is diminished. The relay 65 thereupon releases its armature 67 so that the signal voltage on the lead 43 may be taken through now closed contacts 68 of the relay and applied to the amplifier 40a. This signal after amplification and suitable shifting of phase is transmitted through leads 69 to a control field 70 of the motor 39. The other control field 71 is connected directly to the power supply leads 25 which also supply the amplifier 40a.

In response to the signal received from the armature winding 34 and amplified by the amplifier 40a the motor 39 drives the armatures of the control transformers 32 and 33 in a direction tending to reduce the voltage on the lead 43. As this voltage decreases the negative voltage on the condenser 60 of the relay control circuit also decreases and in consequence thereof the current flow through the relay coil 65 is increased until finally the armature 67 of the relay is drawn downwardly against a second contact 72 which is connected through a resistance 73 and the lead 42 to the armature winding 35 of the high speed transformer 33. The contact 72 is also permanently connected through a resistor 74, a condenser 75 and an inductance coil 76 to a ground line 77 connected to the amplifier 40a.

This circuit serves as a damping circuit for the servo and requires that the condenser 75 and inductance coil 76 be tuned for series resonance at the power supply frequency and therefore, according to the carrier current theory, is equivalent to an inductance insofar as variations in control signal are concerned. The circuit comprising the resistor 73, resistor 74 and series resonant condenser and inductance 75, 76 serves as a differentiating circuit to add to the signal from the armature winding 35 a component proportional to the rate of change of amplitude of that signal. This composite or modified signal, when applied through the contact 72 of the relay and amplified by the amplifier 40a, drives the motor 39 in a direction to reduce the error in position and at the same time controls the torque of the motor to prevent appreciable overshooting or hunting about the true balance condition. The resistance value of the resistor 73 and the resistor 74 as well as the ohmic losses in the condenser 75 and the inductance coil 76 are such that for constant amplitude signals the voltage appearing at the relay contact 72 is approximately fifteen per cent of the voltage appearing on the lead 42 connected to the armature of the control transformer 33.

By arranging the stabilizing or damping circuit, the circuit comprising the resistors 73, 74; condenser 75 and inductance coil 76, so that it is in circuit only with the armature 35 of the high speed transformer the damping effect occurs only when there is a small error to be corrected. No damping is required when the error is large since the motor control circuit will always drive the motor toward its balance position.

This arrangement with the damping circuit permanently connected to the high speed control transformer offers another material advantage in the stability afforded by the complete control system. Since the high speed control transformer and generator are usually arranged to rotate from 15 to 20 times faster than the slow speed generator and transformer and since identical units are usually employed the error voltage for small displacements from the true balance or synchronized position vary in much the same ratio, i. e., the voltage generated in the control transformer armature 35 is from 15 to 20 times greater than the voltage generated in the armature winding 34. If the input of the amplifier is switched directly between these widely different voltages when transferring the control between the slow speed and the high speed transformer a serious transient condition is set up in the amplifier because of the sudden change in amplitude of the signal. This effect is reduced to negligible proportions in the circuit arrangement illustrated because the output of the damping circuit, the voltage applied at the contact 72 is a relatively small portion of the voltage developed by the armature winding 35.

These effects are illustrated graphically in Figure V. In this figure the voltage output of the control transformer is indicated for various amounts of angular error or lack of synchronism. Thus in this graph a nearly straight line 78 indicates the signal voltage available at the relay contacts 68 (coarse signal) for various amounts of angular error between the position of the output shaft 36 and the torque amplifier shaft 7. When there is no angular error this voltage goes to zero or at least to a very small value determined by the quality of the generator and control transformer.

A portion of a sine curve shown as a line 79 in Figure V represents the amplitude of the voltage appearing at the relay contacts 72 for ½ revolution of angular error in position of the high speed armature 35. The relative amplitudes of these voltages as shown presupposes such a slow variation in amplitude that the effect of the damping circuit, the series resonant circuit, is not a factor in determining the amplitude of the voltage. Actually since the relay operation takes place when the motor 39 is driving the control transformer 32 and 33 at relatively rapid speeds the amplitude of the high speed control transformer voltage as represented by the curve 79 will vary quite widely from the amplitude actually shown. If the error is increasing the voltage, represented by the line 79a, is considerably greater while if the error is decreasing the voltage, represented by a line 79b, is reduced or even reversed.

The amount of the increase or the reduction in voltage depends upon the rate of change of the output voltage of the high speed control transformer 33.

This diagram illustrates the operation of the relay control circuit 55 which is controlled according to the amplitude of the signal voltage generated in the armature of the control transformer 32. Since there is no damping circuit involved in this control circuit the line 78 represents the actual voltage regardless of the rate of change of voltage. Assuming first that the error is increasing, the voltage applied to the input of the amplifier is the voltage represented by the line 79a. Simultaneously the voltage of the slow speed control transformer is increasing along the line 78. This voltage, through the action of the half-wave rectifier in the dual triode tube 56, charges the condenser 60. When the voltage increases to that represented by a point 80 on the diagram the current through the relay coil 65 is reduced sufficiently to release the armature 67. A moment later the armature 67 closes the contact 68 and the input to the amplifier then corresponds to the voltage represented by the line 78, the output of the slow speed control transformer. This operation of switching from control exercised by the high speed transformer to control exercised by the low speed transformer involves a sudden appreciable change (decrease) in voltage to the amplifier at the instant of transfer. The resulting transient in the amplifier is not serious in its effect nor noticeable in the performance of the system because the motor is already accelerating and the signal amplitude applied to the amplifier is sufficient to maintain full torque on the motor even though there is a material reduction in input voltage.

When the remote indicator mechanism is approaching synchronism with the weighing scale indicator the action of the relay control circuit 55 is reversed. In this case the voltage applied to the relay control circuit 55 again is represented by the line 78 and when a point 81 is reached the negative voltage on the condenser 60 has decreased to such an extent that the second section of the dual triode 56 draws enough current to energize the relay coil 65. An instant later the armature 67 closes its contacts 72 and the control shifts from the slow speed transformer voltage represented by the line 78 to that represented by the lines 79 or 79b along a line such as the dotted line 82 on the diagram. The diagram indicates that while the voltage at the contacts 72, represented by the line 79 during slow changes in amplitude, exceeds that at the contacts 68, as represented by the line 78, during rapid changes this voltage (line 79b) may be equal to or less than the voltage of the low speed transformer and may even be reversed. These variations in voltage with rate of change of voltage are a result of the action of the series resonant circuit including the condenser 75 and inductance coil 76. The overall effect is to immediately energize the amplifier with such a signal that the motor is supplied with braking torque and the output shaft 36 is quickly and accurately brought to rest in angular synchronism with the weighing scale indicator shaft 5.

This particular arrangement with the damping circuit permanently connected to the armature winding 35 of the high speed control transformer 33 avoids any undesirable transients in the damping circuit since the voltages applied to this circuit are never suddenly changed in amplitude. Therefore the damping circuit is always in condition to apply its component of signal voltage in the control of the motor 39 regardless of the instant at which the relay armature 67 operates.

The remote indicating mechanism comprising a torque amplifier to drive slow and high speed control generators at the weighing scale, and corresponding control transformers and a servo motor at the remote station makes possible a highly accurate remote indication of the magnitude of loads on the weighing scale and the particular arrangement of the damping circuit for the servo mechanism makes possible a smooth transfer of control whenever the angular error in the position of the remote shaft requires a shift in control between the high and low speed control transformers.

Various modifications in the individual elements of the improved control system may be made without departing from the spirit and scope of the invention.

Having described the invention, I claim:

1. In a weighing scale indicating system, in combination, an automatic load counterbalancing mechanism, an indicator shaft that is driven by the load counterbalancing mechanism, a follow-up device having an intermediate speed shaft and an output shaft that is automatically maintained in angular alignment with said indicator shaft, a control generator driven by each of the follow-up shafts, a remote shaft to be positioned in angular alignment with said indicator shaft, a motor for driving the remote shaft, gearing connecting the remote shaft and motor, a control transformer driven by the remote shaft and connected to one of said generators, a second control transformer driven by an intermediate shaft of said gearing and connected to the other of said generators, a series resonant circuit and a resistor connected in series across the output of the second control transformer, an amplifier for controlling the motor and a relay that is controlled by the output of the first control transformer for selecing the input voltage to the amplifier from the voltage across the series resonant circuit and the output of the first control transformer according to the voltage output of the first control transformer.

2. In a weighing scale indicating system, in combination, an indicator shaft that is driven by a load counterbalancing mechanism, a follow-up that positions its output shaft in angular alignment with the indicator shaft, an intermediate shaft included in the gearing of the follow-up, a control generator driven by each shaft of the follow-up, a remote shaft, a motor and gearing for driving the remote shaft, a control transformer mechanically connected to the remote shaft and electrically connected to the generator on the follow-up output shaft, a second control transformer driven by an intermediate shaft of the gearing and electrically connected to the generator that is driven by the intermediate follow-up shaft, a series resonant circuit and a resistor connected across the output of the second control transformer, said gearing and said series resonant circuit being proportioned so that for a given positional error of said remote shaft the voltage across the series resonant circuit is generally equal in amplitude to the voltage output of the first control transformer, an amplifier for controlling the motor, and a relay for selecting according to degree of positional error one of said generally equal voltages as the input to the amplifier.

3. In a data transmitting system for a weighing scale including coarse and fine rotatable transformers and receivers, means for positioning the transformers according to load, an amplifier, and a motor operatively connected to the amplifier and drivingly connected to the receivers, in combination, a damping circuit producing attenuation connected across the output of the fine receiver only, a relay, means responsive to the amplitude of signal from the coarse receiver for operating the relay, and contacts on the relay adapted to selectively connect the input of the amplifier to the coarse receiver or to said damping circuit, whereby the difference in signal amplitude between the coarse and fine signals at the time of operation of the relay is minimized.

References Cited in the file of this patent

UNITED STATES PATENTS

| Number | Name | Date |
|---|---|---|
| 2,142,579 | Wehr | Jan. 3, 1939 |
| 2,208,284 | Weckerly | July 16, 1940 |
| 2,233,415 | Hull | Mar. 4, 1941 |
| 2,414,384 | Moseley | Jan. 14, 1947 |
| 2,439,198 | Bedford | Apr. 6, 1948 |
| 2,446,532 | Edwards | Aug. 10, 1948 |
| 2,446,567 | White et al. | Aug. 10, 1948 |
| 2,459,830 | McCarthy | Jan. 25, 1949 |
| 2,464,566 | Ferrell | Mar. 15, 1949 |
| 2,472,167 | Matson et al. | June 7, 1949 |
| 2,503,046 | Hills | Apr. 4, 1950 |
| 2,518,568 | Pease | Aug. 15, 1950 |
| 2,544,643 | Ahrendt et al. | Mar. 13, 1951 |
| 2,614,237 | Goertz | Oct. 14, 1952 |